June 5, 1951 K. F. SPALDING 2,556,008
PLASTIC SEALING APPARATUS
Filed Dec. 28, 1948 2 Sheets-Sheet 1
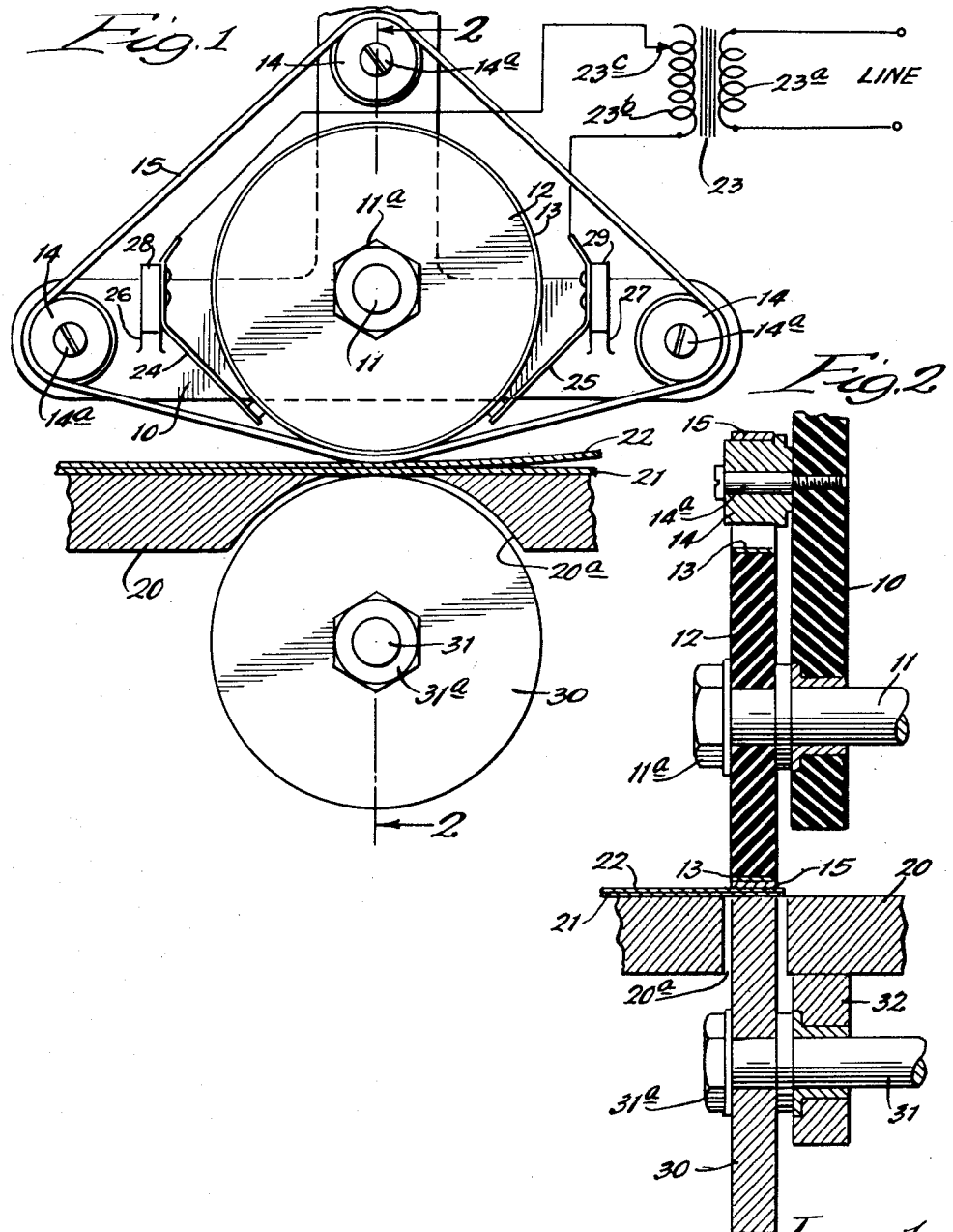
Inventor:
Kenneth F. Spalding,
By Dawson, Orms, Booth and Spangenberg,
Attorneys.

June 5, 1951 K. F. SPALDING 2,556,008
PLASTIC SEALING APPARATUS
Filed Dec. 28, 1948 2 Sheets-Sheet 2
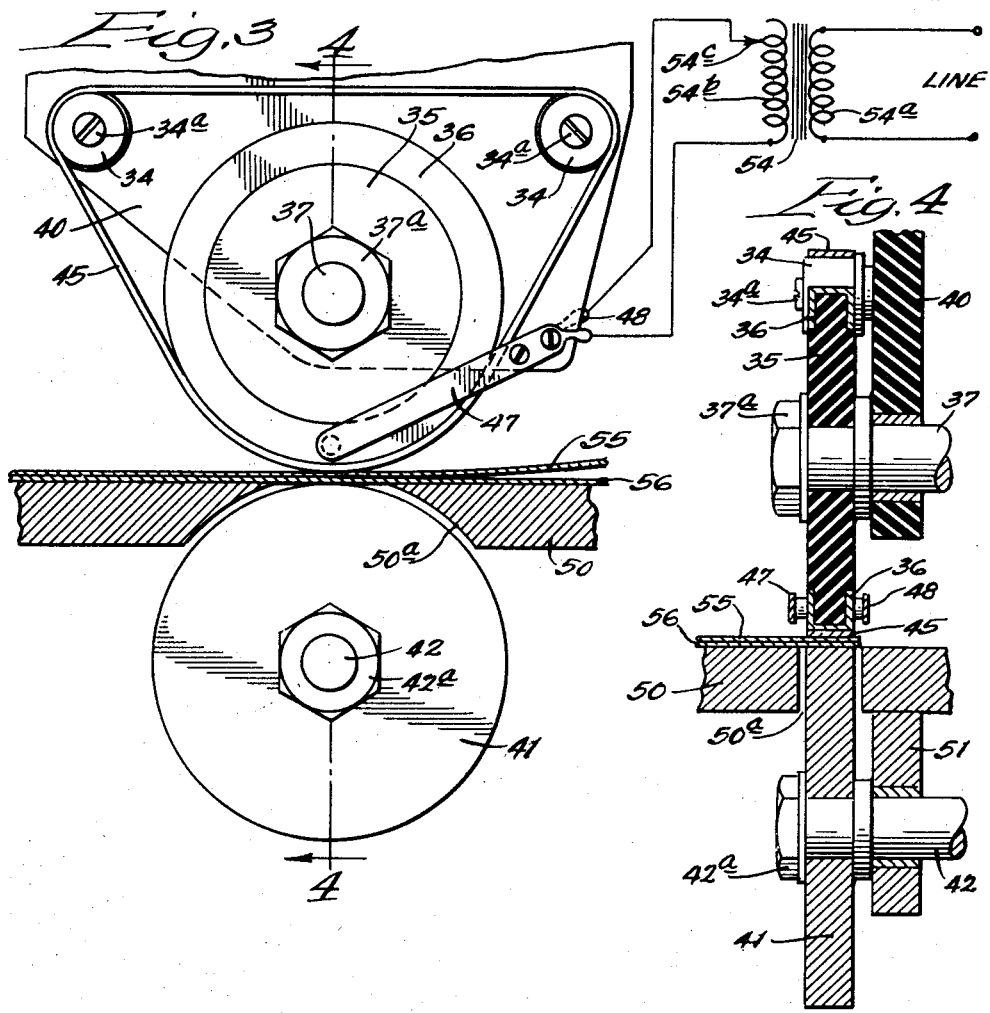
Inventor:
Kenneth F. Spalding,
By Dawson, Orms, Broth and Spingenberg,
Attorneys.

Patented June 5, 1951

2,556,008

UNITED STATES PATENT OFFICE 2,556,008

PLASTIC-SEALING APPARATUS

Kenneth F. Spalding, Chicago, Ill., assignor to William F. Stahl, Kenilworth, Ill.

Application December 28, 1948, Serial No. 67,694

8 Claims. (Cl. 219—19)

This invention relates to apparatus for sealing plastics; in particular, it concerns a means for providing, under accurately controlled conditions, a continuous longitudinal seal between two or more sheets of plastic material.

In the manufacture from plastic sheet stock of envelopes, tubes, and similar products, it is often desirable to produce a continuous, unbroken seal.

In the prior art, such seals have been produced by passing the plastic sheets to be sealed under a hot roller or between a pair of hot rollers. This technique has not been particularly satisfactory, for the reason that precise control of the temperature of a hot roller is difficult, and if the temperature deviates appreciably in either direction from the optimum value, the resulting seal is unsatisfactory. If the temperature is too high, the plastic material will "run" and the work will be spoiled. On the other hand, if the temperature is too low, proper fusion of the sheets will not occur and the seal will be weak or will fail altogether.

The best means of providing the necessary heat for sealing, and at the same time maintaining accurate temperature control, is to use a sealing roller which is cold except for a strip of electrical resistance material such as Nichrome. In the present invention, I have provided a means of sealing with an electrical heating element which is capable of sealing continuously plastic sheets as they are fed through the machine, with no breaks or discontinuities in the seal.

It is accordingly an object of this invention to provide, in a plastic-sealing machine, an electrically operated sealing element which produces a continuous, unbroken and uniform seal.

Another object of this invention is to provide a sealing element, for use in a plastic-sealing machine, in which heat is transmitted to the plastic from a continuous, circular strip of electrical resistance material.

Still another object of my invention is to provide, in a plastic-sealing machine, a combination of a sealing member capable of producing a continuous longitudinal seal in plastic sheets with a buffer device which protects the plastic sheets from direct exposure to the electrical heating element.

Still a further object of my invention is to provide, in a plastic-sealing machine, a sealing element having a continuous electrical heating element capable of producing a homogeneous longitudinal seal of any desired length and in which precise control of temperature is readily possible.

Other objects and advantages of my invention will appear as the specification proceeds.

In the accompanying drawings, I have shown my invention in two illustrative embodiments. The first embodiment is shown in Figures 1 and 2; Fig. 1 is a partially diagrammatic view of my invention in front elevation, part of the drawing being in section; and Fig. 2 is a sectional view of the apparatus of Fig. 1, the section being taken along the line 2—2 of Fig. 1. The second embodiment of my invention is shown in Figs. 3 and 4, Fig. 3 being a partially diagrammatic view in front elevation, partly in section, and Fig. 4 being a sectional view of the apparatus of Fig. 3, the section being taken along line 4—4 of Fig. 3.

As shown in Figs. 1 and 2, the first embodiment of my invention is intended for use in a machine wherein plastic sheets to be sealed together longitudinally are fed by any suitable means along the surface of a table 20. A pair of typical plastic sheets are shown in the drawing and designated 21 and 22 respectively.

A supporting frame 10 is mounted by any suitable means a short distance above table 20. Journalled into a suitable bearing in frame member 10 is a shaft 11 on which is mounted a wheel 12, nut 11a being threaded onto the end of shaft 11 to hold wheel 12 firmly in position.

Wheel 12 should preferably be formed of some insulating material capable of withstanding reasonably high temperatures. Around the circumference of wheel 12, in the manner of a rim or tire, is a strip 13 of electrical resistance material, such as Nichrome. If wheel 12 is made of insulating material, the electrical resistance element 13 may be fitted snugly directly over the rim of wheel 12; if wheel 12 should be made of metal, then it would be necessary to provide an insulating washer to separate heating element 13 from the remainder of wheel 12.

Three wheels 14 are carried respectively on shafts 14a, which are supported on frame member 10 as shown. An endless belt 15, formed of a flexible, heat-resistant material, such as "teflon," is carried under slight tension by the three wheels 14 and the main wheel 12. A pair of small projections, designated respectively 26 and 27, extend forward from the face of frame member 10, and mounted on those projections are the stand-off insulators 28 and 29. Secured to stand-off insulator 28 is a spring rubbing contact 24 which bears on the face of resistance element 13 at a point a few degrees removed from the portion of wheel 12 which is nearest table 20. A similar spring rubbing contact 25 is carried by stand-off insulator 29; it presses against resistance element 13 at a point on the opposite side of the wheel 11, symmetrically with contact member 24.

Within a recess 20a in the under side of table 20 a wheel 30 is mounted for cooperative action with wheel 12. Wheel 30 is carried by shaft 31, secured thereon by nut 31a. Shaft 31, in turn, is journalled into a bearing member 32 which is carried by the under side of table 20. The uppermost part of recess 20a passes through the top surface of table 20, so that as plastic sheets 21 and 22 pass along the surface of table 20, they come in contact with the uppermost portion of roller 30.

If desired, the frame member 10 may be resiliently mounted with respect to table 20 so that wheel 12 presses downward on the plastic sheet 22 and maintains thereby a moderate degree of pressure against roller 30.

A transformer 23 is provided to supply electrical current to the resistance element 13; the primary coil 23a of transformer 23 is connected to any suitable source of alternating current (designated "Line"), and one side of the secondary coil 23b is connected to rubbing contact member 25. Rubbing contact member 24 is connected to an adjustable arm 23c which makes contact with the turns of winding 23b. Thus, by appropriate adjustment of contact member 23c the magnitude of the current fed to resistance element 13 can be adjusted to any desired value within wide limits.

The shafts 11 and 31 may, if desired, be driven by any suitable means and may thereby assist in advance of the plastic sheets 21 and 22. Alternatively, if desired, other means can be provided for advancing the plastic sheets, and rollers 12, 30, and 14 can be made to turn as the plastic sheets are advanced by reason of the friction existing between the plastic sheets and the rollers.

*Operation*

In operating my invention, a suitable pair of plastic sheets should be started between the rollers 12 and 30. In most manufacturing operations, these sheets will be taken from one or more spools of plastic stock. The adjustable member 23c on transformer 23 should be set to provide the optimum current to raise electrical heating element 13 to the best temperature for sealing the plastics. (It will be understood that adjustable transformer 23 may in practice be replaced with an auto-transformer, or any suitable variable-current source.) If the machine is to be used for sealing only one type of plastic, a fixed current source of the proper magnitude may be supplied in substitution for the variable arrangement shown.

When current is supplied by transformer 23, it flows through rubbing contact 24, resistance element 13, rubbing contact 25, and so back to transformer 23. In resistance element 13, the current will of course divide, a part passing through the short path between rubbing contacts 24 and 25, and the remainder taking the long path around the periphery of wheel 12. Since the resistance of the short path is much lower than that around the periphery of the wheel, most of the current flows through the short path between the contacts, and as a result the portion of the resistance element which lies adjacent the plastic sheets 21 and 22 is substantially hotter than the remainder of the element 13. Thus, with my invention, the heating element 13 can be supplied with current without the necessity for breaking it or interrupting its smooth surface at any point along its circumference.

The endless belt 15 is provided in my preferred embodiment to protect the plastic from direct contact with the heating element, which might in certain cases cause adhesions and tearing of the sheets. Also, when the endless belt 15 is employed as a buffer, the sealing temperature is in most cases somewhat less critical than when the sealing element is placed in direct contact with the plastic. With many plastics, however, the endless belt 15 and its supporting wheels 14 may be dispensed with, the sealing roller 12 in that case bearing directly on the plastic sheets to be sealed together.

*The second embodiment*

An alternative embodiment of my invention is illustrated in Figs. 3 and 4. As will be seen from examination of those figures, the structure is closely similar to that of the Fig. 1 embodiment except as to the form of the heating element and the contacts which rub thereon.

A table 50 is provided to receive the pair of plastic sheets, 55 and 56 respectively, which are to be sealed together. A roller 41 is fitted within recess 50a in the under side of table 50, roller 41 being supported on shaft 42 by nut 42a. Shaft 42 is journalled into a bearing member 51, carried by table 50.

A frame member 40 is suitably mounted above table 50; as with the first embodiment, this frame member may, if desired, be resiliently supported so as to be urged downward with moderate pressure.

A roller 35 is supported on shaft 37 by nut 37a; shaft 37 is journalled into a suitable bearing in frame member 40. A rim or tire 36 of electrical resistance material, having in cross section the shape of the letter U, is mounted on the outer rim of roller 35. An endless belt 45, made of a flexible, heat-resistant material, as in the first embodiment, is supported by roller 35 and a pair of auxiliary rollers 34, which are rotatably carried on axles 34a.

A pair of spring rubbing contact members 47 and 48 are mounted on frame member 40 and adapted to press on opposite sides of electrical resistance element 36 at the point where resistance element 36 is adjacent the plastic sheets 55 and 56. If frame member 40 is formed of an insulating material, spring contact members 47 and 48 may be mounted directly on frame member 40, as shown. If frame member 40 is made of metal, insulating supports must be provided for attaching contact members 47 and 48 to the frame member 40.

Electrical current for the heating element 36 is provided by a transformer 54, the primary coil of which is connected to a suitable source of alternating current, marked "Line," and the secondary winding of which is connected to contact members 47 and 48. As with the first embodiment, and adjustable arm 54c is provided on the secondary winding 54b to permit ready control of the current flowing to the heating element 36.

The operation of this second embodiment is substantially similar to that of the first embodiment heretofore described in detail. The significant difference between the two structures is in the design of the heating element and the rubbing contacts which cooperate therewith. In the second embodiment, the main path of current is from one side of the element 36 to the point directly opposite on the other side, in the axial direction. Other paths for the flow of current through the element exist, of course, but their resistance is so high compared to that of the direct path that most of the current flows through the path immediately adjacent the plastic sheets. As a result, that portion of the wheel, as it turns in operation, is always maintained at the temperature best suited for sealing the particular plastics being treated.

If desired, a relatively thick rim of Nichrome or other resistance material can be employed in this embodiment instead of the U-shaped rim or tire shown in the drawing. It has been found in practice that a resistance element having a thickness of from one-eighth to three-sixteenths of an inch performs very well, and ample room is provided on the sides of such a heating element to permit contact with spring members 47 and 48.

Just as with the first embodiment, the endless belt of "teflon" may be dispensed with if the plastic being treated can stand direct contact with the heating element without damage.

In the description of my invention I have shown and discussed in considerable detail two specific embodiments. This has been done, however, for illustrative purposes only, and it will be understood that many variations in detail can be made by those skilled in the art without departing from the spirit of my invention.

I claim:

1. In a plastic-sealing machine, a rotatably-mounted, wheel-shaped sealing element adapted to press on the plastic to be sealed, a continuous, circular electrical heating element carried by the rim of the sealing element, and a pair of sliding contacts positioned near the zone of contact between the element and the plastic to slide on the heating element and to pass electrical current through the portion thereof adjacent the plastic in greater magnitude than through the remainder of the element.

2. In an apparatus for sealing plastics, a pair of cooperating rollers, means for advancing a pair of plastic sheets between the rollers, an electrical heating element circumferentially mounted on one of the rollers, and a pair of sliding contacts positioned near the zone of contact between the element and the plastic to slide on the heating element and to pass electrical current through the portion thereof adjacent the plastic for raising the same to sealing temperature.

3. In a plastic-sealing machine, a rotatably-mounted, wheel-shaped sealing element having a rim comprising an endless electrical resistance element and positioned to press against the plastic to be sealed, and a pair of sliding contacts adapted to press radially on the rim to pass electrical current through said rim and to heat to sealing temperature the portion thereof adjacent the plastic.

4. In a plastic-sealing machine, a rotatably-mounted, wheel-shaped sealing element having a rim comprising an endless electrical resistance element and positioned to press against the plastic to be sealed, and a pair of sliding contacts adapted to press axially on the rim to pass electrical current through said rim and to heat to sealing temperature the portion thereof adjacent the plastic.

5. In an apparatus for sealing plastics, a pair of cooperating rollers, means for advancing between the rollers a pair of plastic sheets, a rim for one of the rollers comprising a continuous peripheral strip of electrical resistance material, and a pair of sliding contacts pressing radially on said rim and adapted to pass current continuously therethrough to heat to sealing temperature the portion of said rim adjacent the plastic.

6. In an apparatus for sealing plastics, a pair of cooperating rollers, means for advancing between the rollers a pair of plastic sheets, a rim for one of the rollers comprising a continuous peripheral strip of electrical resistance material, and a pair of sliding contacts pressing axially on said rim and adapted to pass current continuously therethrough to heat to sealing temperature the portion of said rim adjacent the plastic.

7. In an apparatus for sealing plastics, a pair of cooperating rollers, means for advancing a pair of plastic sheets between the rollers, an electrical heating element circumferentially mounted on one of the rollers, a pair of sliding contacts positioned to slide on the heating element and to pass electrical current through the portion thereof adjacent the plastic in greater magnitude than through the remainder of the element, and adjustable means connected to the sliding contacts operable to set to a predetermined value the magnitude of current through the sliding contacts.

8. In a plastic-sealing machine, a rotatably mounted, wheel-shaped sealing element adapted to press on the plastic to be sealed, said sealing element having a continuous, circular rim portion adapted to transmit heat to said plastic, and energy-transferring means positioned near the zone of contact between said rim portion and said plastic adapted to supply energy to said rim portion and to heat the same thereby in and near said zone of contact to a greater degree than in the remainder of said rim portion.

KENNETH F. SPALDING.

REFERENCES CITED

The following references are of record in the file of this patent:

UNITED STATES PATENTS

| Number | Name | Date |
|---|---|---|
| 1,267,400 | Gravell | May 28, 1918 |
| 1,300,603 | Gravell | Apr. 15, 1919 |
| 1,413,053 | Onstad | Apr. 18, 1922 |
| 1,701,918 | Gillis | Feb. 12, 1929 |
| 2,097,427 | Bergstein | Nov. 2, 1937 |
| 2,114,833 | Fincke | Apr. 19, 1938 |
| 2,392,695 | Rhodin | Jan. 8, 1946 |
| 2,451,728 | Gardner | Oct. 19, 1948 |
| 2,476,283 | Callestan | July 19, 1949 |
| 2,491,048 | Jenkins | Dec. 13, 1949 |

FOREIGN PATENTS

| Number | Country | Date |
|---|---|---|
| 20,304 | Great Britain | Dec. 12, 1890 |
| 573,021 | Great Britain | Nov. 2, 1945 |